US006354143B1

(12) United States Patent
Isobe et al.

(10) Patent No.: US 6,354,143 B1
(45) Date of Patent: Mar. 12, 2002

(54) EVAPORATED FUEL TREATMENT APPARATUS FOR INTERNAL COMBUSTION ENGINE

(75) Inventors: Takashi Isobe; Takashi Yamaguchi, both of Saitama; Satoshi Kiso, Tochigi, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/496,895

(22) Filed: Feb. 2, 2000

(30) Foreign Application Priority Data

Feb. 5, 1999 (JP) .......................................... 11-029261

(51) Int. Cl.[7] ................................................ G01M 3/04
(52) U.S. Cl. ....................................... 73/49.7; 73/118.1
(58) Field of Search .......................... 73/40, 40.5, 42.7, 73/49.7, 118.1; 123/518, 519, 520

(56) References Cited

U.S. PATENT DOCUMENTS 5,261,379 A * 11/1993 Lipinski et al. ............. 123/520
5,275,144 A * 1/1994 Gross ......................... 123/520
5,327,873 A * 7/1994 Ohuchi et al. .............. 123/520
5,396,873 A * 3/1995 Yamanaka et al. .......... 123/520
5,437,257 A * 8/1995 Giacomazzi et al. ........ 123/520
5,467,641 A * 11/1995 Williams et al. ............. 73/49.7
5,575,267 A * 11/1996 Matsumoto et al. ........ 123/698
5,614,665 A * 3/1997 Curran et al. .............. 73/118.1
5,637,788 A * 6/1997 Remboski et al. ....... 73/40.5 R
5,678,523 A * 10/1997 Hashimoto et al. .......... 123/520
5,679,890 A * 10/1997 Shinohara et al. .......... 73/118.1
5,765,540 A * 6/1998 Ishii et al. .................. 123/520
6,073,487 A * 6/2000 Dawson ...................... 73/118.1
6,089,081 A * 7/2000 Cook et al. ................ 73/118.1

FOREIGN PATENT DOCUMENTS

JP 07 083125 3/1995

* cited by examiner

*Primary Examiner*—Hezron Williams
*Assistant Examiner*—C D Garber
(74) *Attorney, Agent, or Firm*—Seed IP Law Group PLLC

(57) ABSTRACT

An evaporated fuel treatment apparatus that has a leakage checking means that detects the conditions of change in the internal pressure of the fuel tank when said fuel tank is closed after being placed under a negative pressure, and a judgement means that judges the presence or absence of leakage in the fuel tank on the basis of the detection results obtained by the leakage checking means and correction checking means. The apparatus further includes a pressure variation checking means which detects the degree of pressure variation in the fuel tank, and then opens the fuel tank to the atmosphere and judges whether or not the pressure inside the fuel tank has dropped. Judgement prohibition means is provided that prohibits a judgement of the presence or absence of leakage from being made by the judgment means in response to a judgement by the pressure variation checking means that the pressure has dropped. Accordingly, a judgement of the presence or absence of leakage in the tank system is prevented from being performed in cases where such a judgement might be inaccurate.

9 Claims, 8 Drawing Sheets

EVAPORATED FUEL TREATMENT APPARATUS FOR INTERNAL COMBUSTION ENGINE

FIELD OF THE INVENTION

The present invention concerns an evaporated fuel treatment apparatus for an internal combustion engine that releases evaporated fuel generated inside the fuel tank into the intake manifold of the internal combustion engine. More particularly, the present invention concerns an evaporated fuel treatment apparatus for an internal combustion engine that makes it possible to ascertain the presence or absence of leakage in an evaporated fuel discharge prevention system extending from the fuel tank to the engine intake system.

BACKGROUND OF THE INVENTION

A method for judging the presence or absence of leakage in a tank system is described in Japanese Patent Application Kokai No. Hei 7-83125. In this method, the pressure in an evaporated fuel discharge prevention system is lowered to a predetermined pressure; next, with the target pressure reduction value of the pressure in the fuel tank alternately set at an upper-limit value and a lower-limit value, a feedback pressure reduction process which gradually causes the pressure in the fuel tank to converge on the target pressure reduction value is performed, and the amount of pressure shift in the fuel tank per unit time is calculated (leak down checking mode). In order to eliminate the effect of vapor on the judgement results, the amount of pressure shift per unit time caused by the evaporated fuel is calculated as a correction value. Judgement of the presence or absence of leakage in the tank system is accomplished on the basis of a value obtained by subtracting the value produced by multiplying the amount of pressure shift calculated in the correction checking mode by a coefficient from the amount of pressure shift calculated in the leak down checking mode. If this value is equal to or less than a predetermined value, it is judged that the tank system is normal, with no leakage; on the other hand, if this value exceeds the predetermined value, it is judged that there is leakage in the tank system.

However, in cases where the amount of vapor generated during the leak check described above is extremely large, the internal pressure of the fuel tank may fluctuate from a negative pressure to a positive pressure. A detailed examination of the shift patterns of the internal pressure of the fuel tank during the leak checking mode reveals that (a) the amount of pressure shift per unit time increases with increasing negative pressure, (b) the amount of pressure shift decreases as atmospheric pressure is approached, and (c) the amount of pressure shift tends to be small in the case of a positive pressure. Accordingly, in cases where the internal pressure of the fuel tank fluctuates to a positive pressure during the leak check, the overall amount of shift in the internal pressure of the fuel tank is extremely small; as a result, the system may be erroneously judged to be normal even when leakage has occurred. Furthermore, since a long period of time ranging from 30 seconds to 60 seconds is required in order to detect leakage caused by extremely small holes such as holes with a diameter of 0.5 mm, cases in which a large amount of vapor is generated during this period may easily occur.

In such cases, leakage may be detected even though no leakage actually exists, and if the warning lamp is frequently lit as a result, this can challenge the practical utility of the vehicle. Conversely, if no leakage is detected even though leakage actually exists, this has a deleterious effect on the environment.

SUMMARY OF THE INVENTION

An evaporated fuel treatment apparatus is constructed which is characterized by the fact that in an evaporated fuel treatment apparatus which has (a) a leakage checking means which detects the conditions of change in the internal pressure of the fuel tank when said fuel tank is closed after being placed under a negative pressure, and (b) a judgement means which judges the presence or absence of leakage in the fuel tank on the basis of the detection results obtained by the leakage checking means and correction checking means. The apparatus further including a pressure variation checking means which detects the degree of pressure variation in the fuel tank, and then opens the fuel tank to the atmosphere and judges whether or not the pressure inside the fuel tank has dropped, and a judgement prohibition means which prohibits a judgement of the presence or absence of leakage from being made by the judgment means, in response to a judgement by the pressure variation checking means that the pressure has dropped. Accordingly, a judgement of the presence or absence of leakage in the tank system is prevented from being performed in cases where such a judgement might be inaccurate.

The fuel tank is opened to the atmosphere following the tank leak check, and if the internal pressure of the fuel tank is found to have fluctuated from a positive pressure to atmospheric pressure, this means that an accurate judgement of the presence or absence of leakage in the tank system cannot be made. Accordingly, such a judgement is prohibited. As a result, judgments can be avoided under conditions in which an erroneous judgement might occur in the judgement of the presence or absence of leakage in the tank system, so that the reliability of such judgments can be improved.

DETAILED DESCRIPTION OF THE INVENTION

Preferred Embodiment of the Evaporated Fuel Treatment Apparatus

Next, a working configuration of the present invention will be described with reference to the attached figures. FIG.

1 is an overall structural diagram of an evaporated fuel treatment apparatus for an internal combustion engine constructed according to a working configuration of the present invention. This apparatus includes an internal combustion engine (hereafter referred to as the "engine") 1, an evaporated fuel discharge prevention device 31 and an electronic control unit (hereafter referred to as the "ECU") 5.

The ECU 5 includes a CPU 91 that performs operations in order to control various parts of the engine 1, a read-only memory (ROM) 92 that stores various types of data and programs that are used to control various parts of the engine, a random-access memory (RAM) 93 that provides a working region for operations by the CPU 91, and which temporarily stores data sent from various parts of the engine and control signals that are to be sent out to various parts of the engine, an input circuit 94 that receives data sent from various parts of the engine, and an output circuit 95 that sends out control signals to various parts of the engine.

Figure 1:
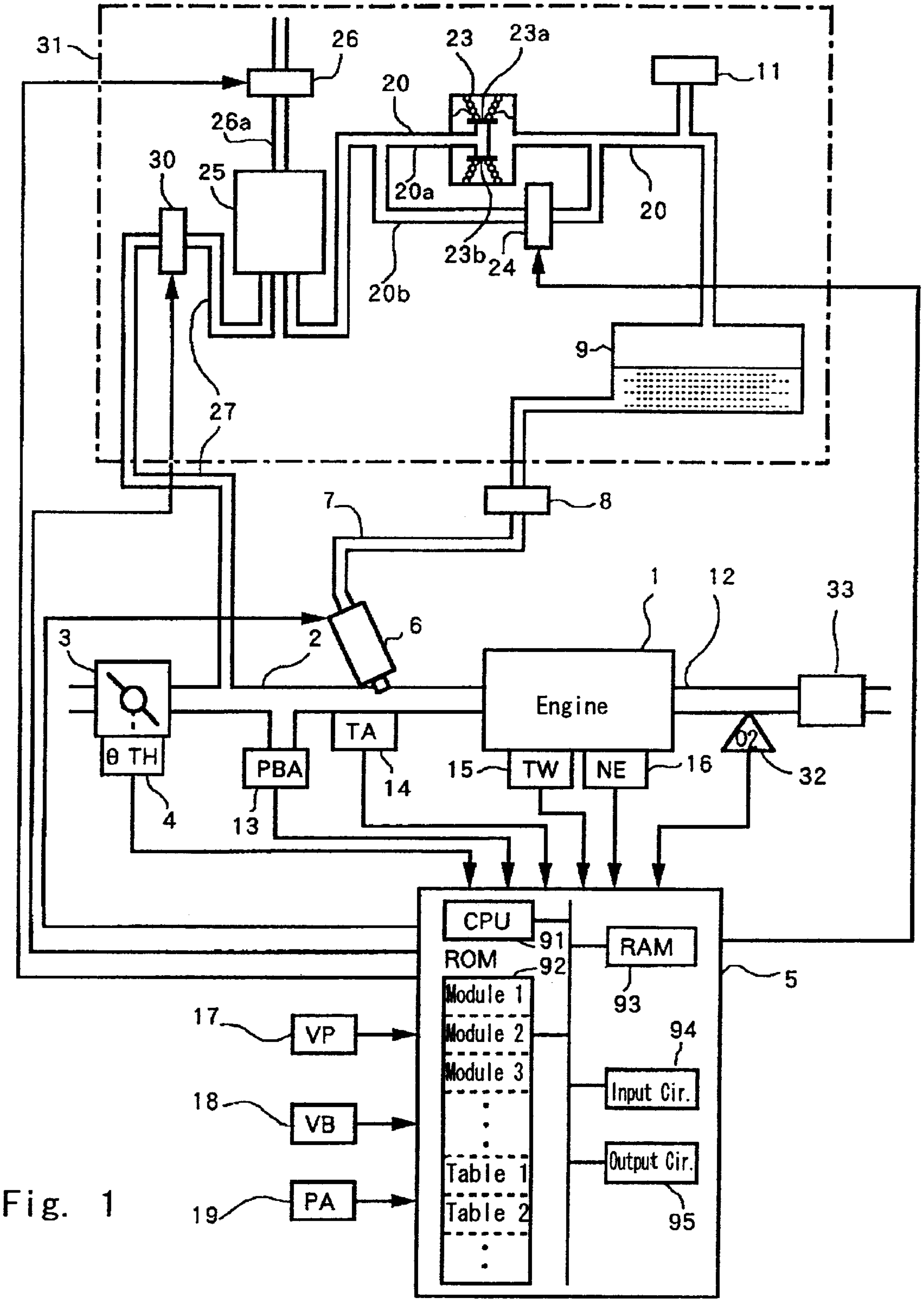
FIG. 1 is a diagram illustrating the evaporated fuel treatment apparatus of the present invention.

In FIG. 1, the programs are indicated as module 1, module 2, module 3, etc.; for example, the program which detects the presence or absence of leakage in the present invention is contained in modules 3, 4 and 5. Furthermore, the various types of data used in the above-mentioned operations are stored in the ROM 92 in the form of table 1, table 2, etc. The ROM 92 may be a re-writable ROM such as an EEPROM; in such a case, the results obtained from the operations of the ECU 5 in a given operating cycle are stored in the ROM and can be utilized in the next operating cycle. Furthermore, considerable quantities of flag information set in various processes can be recorded in the EEPROM and utilized in trouble diagnosis.

For example, the engine 1 is an engine equipped with four cylinders, and an intake manifold 2 is connected to this engine. A throttle valve 3 is installed on the upstream side of the intake manifold 2, and a throttle valve opening sensor (θTH) 4, which is linked to the throttle valve 3, outputs an electrical signal that corresponds to the degree of opening of the throttle valve 3, and sends this electrical signal to the ECU 5.

A fuel injection valve 6 is installed for each cylinder at an intermediate point in the intake manifold 2 between the engine 1 and the throttle valve 3. The opening time of these injection valves 6 is controlled by control signals from the ECU 5. A fuel supply line 7 connects the fuel injection valves 6 and the fuel tank 9, and a fuel pump 8 installed at an intermediate point in this fuel supply line 7 supplies fuel from the fuel tank 9 to the fuel injection valves 6. A regulator (not shown in the figures) is installed between the pump 8 and the respective fuel injection valves 6. This regulator acts to maintain the differential pressure between the pressure of the air taken in from the intake manifold 2 and the pressure of the fuel supplied via the fuel supply line 7 at a constant value. In cases where the pressure of the fuel is too high, the excess fuel is returned to the fuel tank 9 via a return line (not shown in the figures). Thus, the air taken in via the throttle valve 3 passes through the intake manifold 2. This air is then mixed with the fuel injected from the fuel injection valves 6 and is supplied to the cylinders of the engine 1.

An intake manifold pressure (PBA) sensor 13 and an intake air temperature (TA) sensor 14 are mounted in the intake manifold 2 on the downstream side of the throttle valve 3. These sensors convert the intake manifold pressure and intake air temperature into electrical signals and send these signals to the ECU 5.

An engine water temperature (TW) sensor 15 is attached to the cylinder peripheral wall (filled with cooling water) of the cylinder block of the engine 1. This sensor 15 detects the temperature of the engine cooling water, converts this temperature into an electrical signal and sends the result to the ECU 5. An engine rpm (NE) sensor 16 is attached to the periphery of the cam shaft or the periphery of the crank shaft of the engine 1. This sensor outputs a signal pulse (TDC signal pulse) at a predetermined crank angle position with every 180-degree rotation of the crank shaft of the engine 1 and sends this signal to the ECU 5.

The engine 1 has an exhaust manifold 12, and exhaust gases are discharged via a ternary catalyst 33 constituting an exhaust gas cleansing device, which is installed at an intermediate point in the exhaust manifold 12. An O2 sensor 32 constitutes an exhaust gas concentration sensor. This sensor 32 is mounted at an intermediate point in the exhaust manifold 12. This sensor 32 detects the oxygen concentration in the exhaust gas and sends a signal corresponding to the detected value to the ECU 5.

A vehicle speed (VP) sensor 17, a battery voltage (VB) sensor 18 and an atmospheric pressure (PA) sensor 19 are connected to the ECU. These sensors respectively detect the running speed of the vehicle, the battery voltage, and the atmospheric pressure, and send these values to the ECU 5.

The input signals from the various types of sensors are sent to the input circuit 94. The input circuit 94 shapes the input signal waveforms, corrects the voltage levels to predetermined levels, and converts analog signal values into digital signal values. The CPU 91 processes the resulting digital signals, performs operations in accordance with the programs stored in the ROM 92, and creates control signals that are sent out to actuators in various parts of the vehicle. These control signals are sent to the output circuit 95, and the output circuit 95 sends the control signals to actuators such as the fuel injection valves 6, bypass valve 24, vent shut valve 26 and purge control valve 30, etc.

Next, the evaporated fuel discharge prevention system (hereafter referred to as the "discharge prevention system") 31 will be described. The discharge prevention system 31 includes a fuel tank 9, a charging passage 20, a canister 25, a purging passage 27, and several control valves. This system 31 controls the discharge of evaporated fuel from the fuel tank 9. The discharge prevention system 31 can be conveniently viewed as being divided into two parts, with the bypass valve 24 in the charging passage 20 as the boundary between the two parts. The side including the fuel tank 9 is referred to as the tank system, while the side including the canister 25 is referred to as the canister system.

The fuel tank 9 is connected to the canister 25 via the charging passage 20, and the system is thus arranged so that evaporated fuel from the fuel tank 9 can move to the canister 25. The charging passage 20 has a first branch **20*a* and a second branch 20*b*. These branches are installed inside the engine space. An internal pressure sensor 11 is attached to the fuel tank side of the charging passage 20. This sensor 11 detects the differential pressure between the internal pressure of the charging passage 20 and atmospheric pressure. In a normal state, the pressure inside the charging passage 20 is more or less equal to the pressure inside the fuel tank 9; accordingly, the internal pressure detected by the internal pressure sensor 11 may be viewed as the pressure in the fuel tank 9** (hereafter referred to as the "tank pressure").

A two-way valve 23 is installed in the first branch **20*a*. This two-way valve 23 includes two mechanical valves 23*a* and 23*b*. The valve 23*a* is a positive-pressure valve that opens when the tank pressure reaches a value that is approximately 15 mmHg higher than atmospheric pressure. When this valve is in an open state, evaporated fuel flows to the canister 25 and is adsorbed in the canister. The valve 23***b* is a negative-pressure valve that opens when the tank pressure is approximately 10 mmHg to 15 mmHg lower than the pressure on the side of the canister 25. When this valve is in an open state, the evaporated fuel adsorbed in the canister 25 returns to the fuel tank 9.

A bypass valve 24, which is an electromagnetic valve, is installed in the second branch 20*b*. This bypass valve 24 is ordinarily in a closed state. When leakage is detected in the discharge prevention system 31 of the present invention, the opening and closing action of this valve is controlled by control signals from the ECU 5.

The canister 25 contains active carbon that adsorbs the evaporated fuel. This canister 25 has an air intake port (not shown in the figures) that communicates with the atmosphere via a passage 26*a*. A vent shut valve 26, which is an electromagnetic valve, is installed at an intermediate point in the passage 26*a*. This vent shut valve 26 is ordinarily in an open state. When leakage is detected in the discharge prevention system 31 of the present invention, the opening and closing action of this valve is controlled by control signals from the ECU 5.

The canister 25 is connected to the intake manifold 2 on the downstream side of the throttle valve 3 via a purging passage 27. A purge control valve 30, which is an electromagnetic valve, is installed at an intermediate point in the purging passage 27. The fuel adsorbed in the canister 25 is purged into the intake system of the engine via this purge control valve 30. The on-off duty ratio of the purge control valve 30 is altered on the basis of control signals from the ECU 5, so that the flow rate is continuously controlled.

Figure 2:
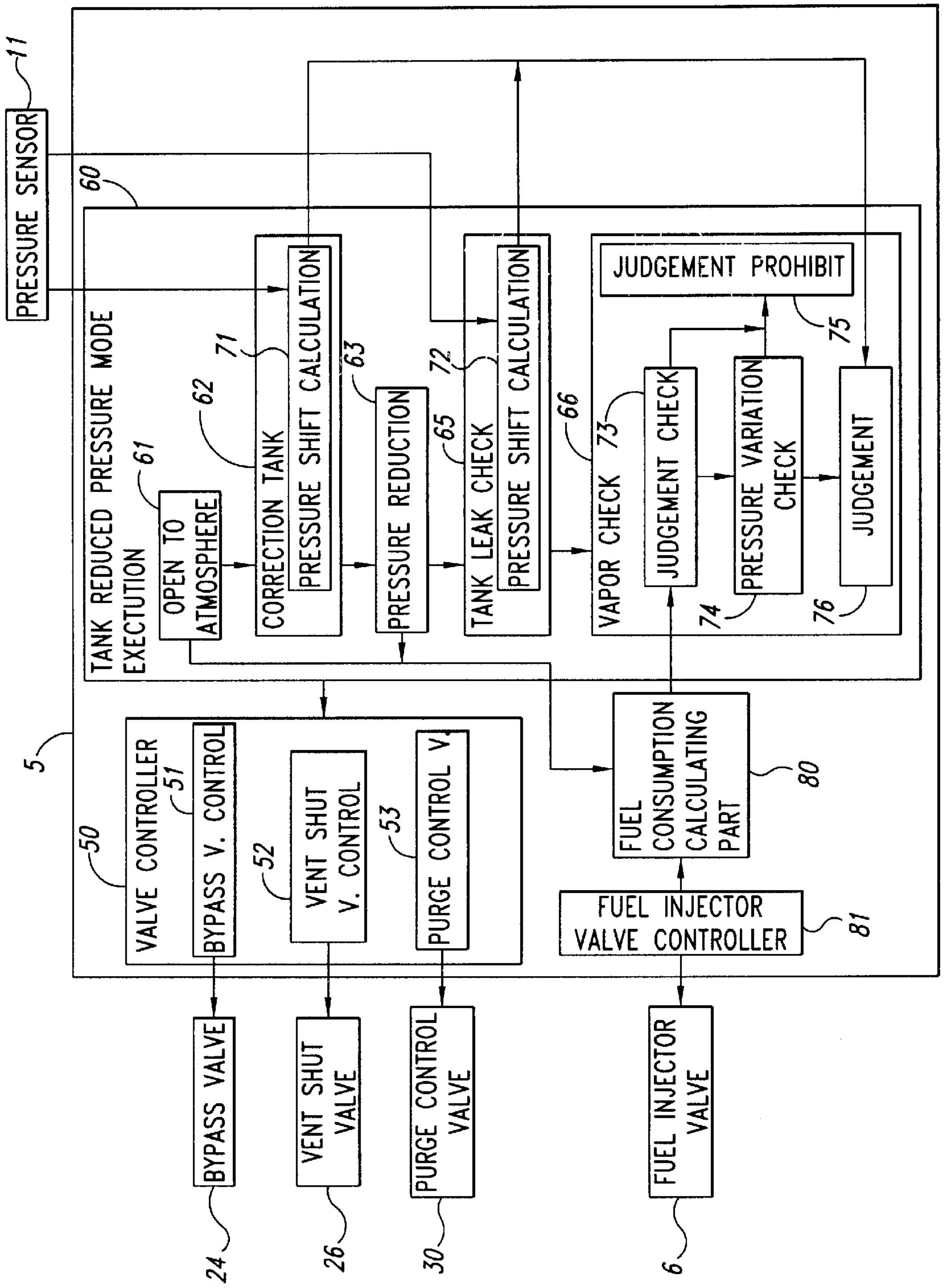
FIG. 2 is a functional block diagram of an Electronic Control Unit (ECU) used in the present invention.

FIG. 2 shows the ECU 5 associated with this working configuration of the present invention in terms of functional blocks. These functional blocks are realized by means of the hardware construction of the ECU 5 shown in FIG. 1 and the programs stored in the ROM 92. The transfer of data by the functional blocks in the ECU 5 is accomplished mainly via the RAM 93 (FIG. 1). The ECU 5 includes a valve control part 50, a tank pressure reduction mode execution part 60, a fuel consumption calculating part 80, and a fuel injection valve control part 81.

The valve control part 50 includes a bypass valve control part 51 that controls the opening and closing of the bypass valve 24, a vent shut valve control part 52 that controls the opening and closing of the vent shut valve 236, and a purge control valve control part 53 that controls the amount of opening of the purge control valve 30. This valve control part 50 sends driving signals to the respective valves in accordance with control signals from the tank pressure reduction mode execution part 60.

The tank pressure reduction mode execution part 60 includes an opening-to-atmosphere part 61, a correction checking part 62, a pressure reduction part 63, a tank leak checking part 65, and a vapor checking part 66. This tank pressure reduction mode execution part 60 performs tank pressure reduction monitoring, which will be described later with reference to FIG. 4. The correction checking part 62 and tank leak checking part 65 respectively include pressure shift calculating parts 71 and 72. These pressure shift calculating parts 71 and 72 respectively calculate the amounts of pressure shift per unit time during the correction check and tank leak check on the basis of the pressure values detected by the internal pressure sensor 11. The calculated values are sent to the judgement part 76 of the vapor checking part 66.

On the basis of signals from various types of sensors (not shown in the figures), the fuel injection valve control part 81 sends injection signals to the fuel injection valves 6, and thus controls the opening time of the fuel injection valves 6. The opening time of the fuel injection valves 6 are sent to the fuel consumption calculating part 80. On the basis of a flag that is set at 1 by the opening-to-atmosphere part 61 upon the completion of the process performed by said part, the fuel consumption calculating part 80 detects that a correction check is currently being performed, and calculates the amount of fuel consumption on the basis of the opening time of the fuel injection valves 6 received from the fuel injection valve control part 81. Furthermore, on the basis of a flag that is set at 1 by the pressure reduction part 63 upon the completion of the process performed by said part, the fuel consumption calculating part 80 detects that a tank leak check is being performed, and calculates the amount of fuel consumption on the basis of the opening time of the fuel injection valves 6 received from the fuel injection valve control part 81. The respective calculated values are sent to the judgement execution checking part 73 of the vapor checking part 66.

The vapor checking part 66 includes a judgment execution checking part 73, a pressure variation checking part 74, a judgement prohibition part 75 and a judgement part 76. On the basis of the amount of fuel consumption during the correction check and the amount of fuel consumption during the tank leak check calculated by the fuel consumption calculating part 80, the judgement execution checking part 73 ascertains whether or not a judgement of the presence or absence of leakage in the tank system is to be performed. The pressure variation checking part 74 also ascertains whether or not a judgement of the presence or absence of leakage in the tank system is to be performed, depending on whether or not the tank pressure at the time that the tank leak checking part 65 completes its processing is a positive pressure. The judgement prohibition part 75 or the judgement part 76 operates in accordance with the judgement results obtained by the judgement execution checking part 73 and pressure variation checking part 74. The judgement prohibition part 75 prohibits any judgement from being made, while the judgement part 76 judges the presence or absence of leakage in the tank system on the basis of the amounts of pressure shift per unit time during the correction check and tank leak check calculated by the pressure shift calculating parts 71 and 72.

Figure 3:
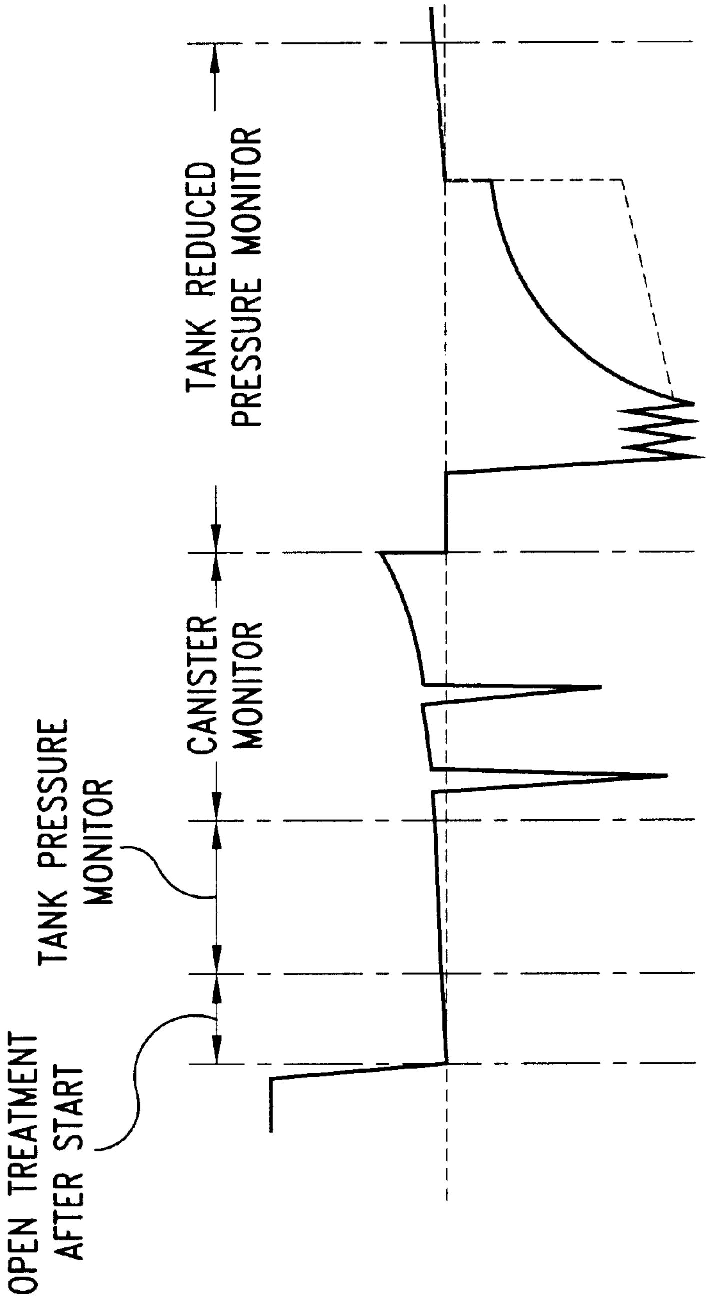
FIG. 3 is a graph showing changes in the pressure during the judgement of the presence or absence of leakage in the discharge prevention system of the evaporated fuel treatment apparatus of the present invention.

Next, an outline of the judgement of the presence or absence of leakage in the discharge prevention system 31 will be described. FIG. 3 shows an example of the transition of the pressure in the tank system during the judgement of the presence or absence of leakage in one operating cycle of the engine from start to stop. The judgement process for the presence or absence of leakage has four stages, i.e., an opening treatment performed after starting, monitoring of the tank pressure, monitoring of the canister and monitoring of the tank pressure reduction. The monitoring of the tank pressure reduction will be described later with reference to FIG. 4; here, an outline of the opening treatment performed after starting, the monitoring of the tank pressure and the monitoring of the canister will be described.

Opening Treatment Following Starting, and Monitoring of Internal Pressure

In the opening treatment performed following starting, the bypass valve 24 and vent shut valve 26 are opened immediately after the engine is started and the purge control valve 30 is closed, so that the pressure of the discharge prevention system 31 is opened to atmospheric pressure. In this case, if the tank pressure fluctuates from the value measured prior to the opening of the system to the atmosphere by an amount equal to or greater than a predetermined value, it is judged that the tank system is normal, with no leakage. This predetermined value is set at different values for holes with diameters of 0.5 and 1 mm. If leakage is present, the tank system prior to starting will be more or less at atmospheric pressure, so that the pressure shift is small.

Following the opening treatment that is performed after starting, monitoring of the tank pressure is performed. In this case, the output level of the internal pressure sensor 11 is continuously checked with the bypass valve 24 in a closed state, and in cases where this level fluctuates to a positive pressure or negative pressure by an amount equal to or greater than a predetermined value, it is judged that there is no leakage.

Canister Monitoring

Canister monitoring includes opening to the atmosphere, pressure reduction, waiting for internal pressure stabilization, leak checking and pressure recovery modes. In canister monitoring, the presence or absence of leakage is judged by placing the canister under a negative pressure, and detecting the conditions of maintenance of this negative pressure.

Tank Pressure Reduction Monitoring

Figure 4:
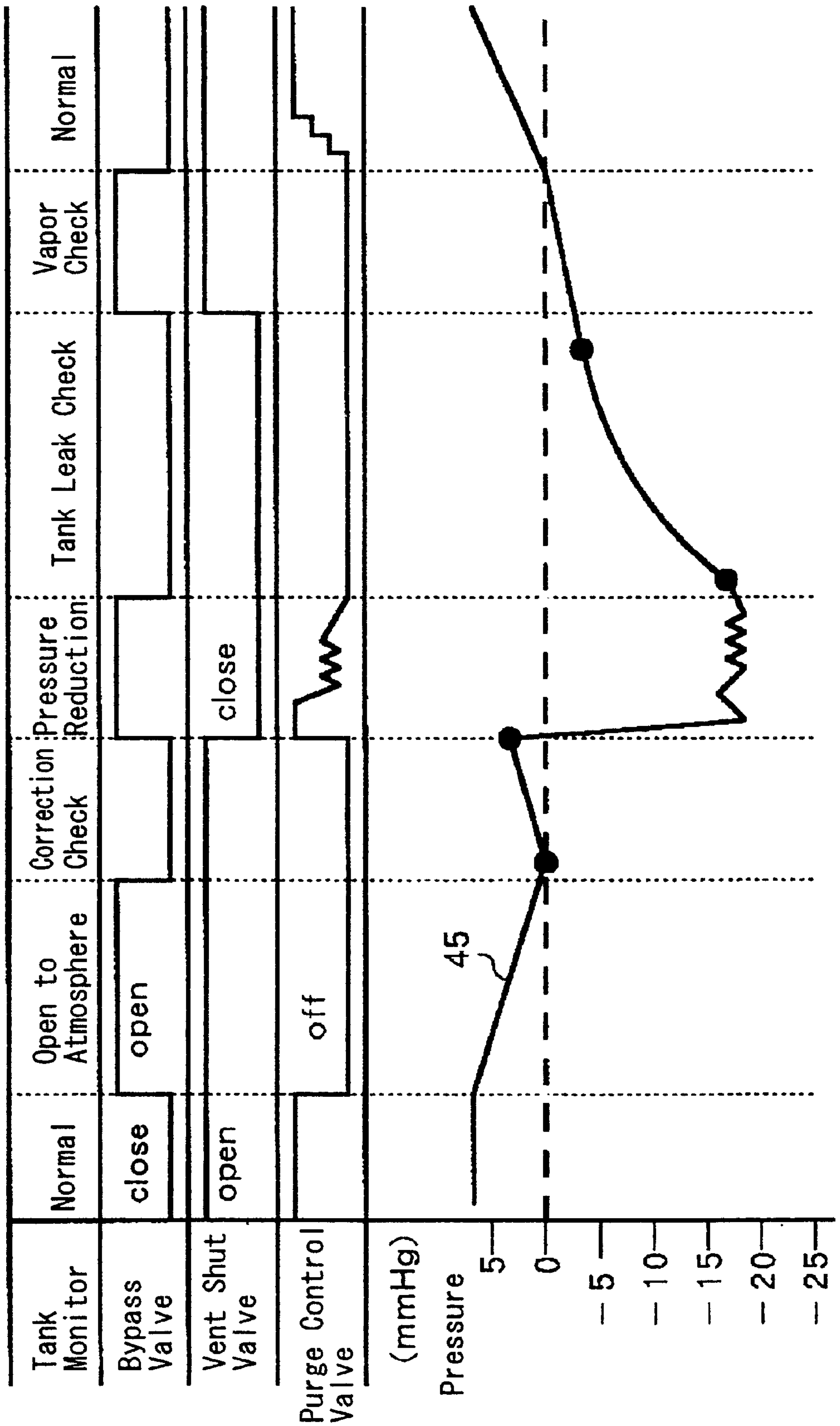
FIG. 4 is a graph showing changes in the tank pressure during the judgement of leakage in the tank system in the tank pressure reduction monitoring portion in FIG. 3.

FIG. 4 is a diagram which shows in detail the tank pressure reduction monitoring portion of the process shown in FIG. 3. Tank pressure reduction monitoring is performed after the internal pressure monitoring, and can detect leakage not detected in the opening treatment performed following starting or the internal pressure monitoring. For example, in cases where the system was judged to be normal (without leakage) only with respect to leakage caused by holes with a diameter of 1 mm or greater in the opening treatment performed following starting or the internal pressure monitoring, the presence or absence of leakage caused by holes with a diameter of 0.5 mm can be judged by performing this tank pressure reduction monitoring. Furthermore, if it is judged in the opening treatment performed following starting and the internal pressure monitoring that the system is normal (with no leakage) according to both the 1 mm diameter criteria and the 0.5 mm diameter criteria, it is also possible to dispense with this tank pressure reduction monitoring.

The tank pressure reduction monitoring includes opening to the atmosphere, correction checking, pressure reduction, tank leak checking and vapor checking (pressure recovery) modes. The solid line 45 indicates the pressure value indicated by the internal pressure sensor 11. In the ordinary mode, only the bypass valve 24 is closed; the vent shut valve 26 and purge control valve 30 are open.

Prior to the operation of the correction checking mode, the bypass valve 24 is opened and the purge control valve 30 is closed, so that there is a shift to the opening-to-the-atmosphere mode. The tank pressure varies toward atmospheric pressure as is shown by the solid line 45. The time required for the operation of the opening-to-the-atmosphere mode is (for example) 15 seconds.

When the tank pressure is at atmospheric pressure, the bypass valve 24 is closed, the vent shut valve 26 is opened, the purge control valve 30 is closed, and the processing shifts to the correction checking mode. Vapor is generated in the fuel tank 9, and the tank pressure rises depending on the amount of this vapor. Accordingly, this rise in pressure must be taken into account in the subsequent judgement of leakage in the tank system. In the correction checking mode, the amount of pressure shift per unit time involved in the rise from atmospheric pressure to a positive pressure is measured as a correction value. The time required for the operation of the correction checking mode is (for example) 30 seconds.

Next, the bypass valve 24 is opened, the vent shut valve 26 is closed, and the processing shifts to the pressure reduction mode. While the purge control valve is controlled, the tank pressure is stably reduced to a predetermined pressure, e.g., −15 mmHg. The internal pressure sensor 11 is installed in the narrow charging passage 20, which quickly shows a negative pressure. Since the volume of the fuel tank 9 is large in comparison, cases arise in which the pressure in the tank is not a negative pressure even though the sensor 11 indicates a negative pressure. Accordingly, in order to obtain a stable negative pressure state, feedback pressure reduction is performed following open pressure reduction.

In the open pressure reduction that is initially performed, an open pressure reduction target flow rate table is searched, the purge flow rate corresponding to the current tank pressure is calculated, the duty ratio corresponding to this purge flow rate is set, and the amount of opening of the purge control valve 30 is controlled accordingly. Afterward, the vent shut valve 26 is closed, and the bypass valve 24 and purge control valve 30 are opened, so that the pressure in the tank system is reduced. The pressure in the tank system is reduced to a certain pressure by continuing this pressure reduction for a predetermined period of time.

Feedback pressure reduction is performed after open pressure reduction has been performed. As a result of open pressure reduction, the tank pressure is closed to the lower-limit value of the pressure reduction target value; accordingly, the next pressure reduction target value is changed to the upper-limit value. The purging flow rate is reduced on the basis of the current tank pressure and the pressure reduction target value so that the tank pressure reaches the pressure reduction target value. The purge control valve 30 is set at the amount of valve opening that corresponds to the reduced purging flow rate. As a result, the tank pressure rises correspondingly. When the tank pressure sensor output reaches the upper-limit value, the reduced target value of the tank pressure is changed to the lower-limit value, and the purging flow rate is increased on the basis of the current tank pressure and the pressure reduction target value so that the tank pressure reaches the pressure reduction target value. The purge control valve 30 is set at the amount of valve opening that corresponds to the increased purging flow rate. As a result, the tank pressure shows a corresponding decrease. When the tank pressure sensor output reaches the lower-limit value, the pressure reduction target value of the tank pressure is changed to the upper-limit value.

When pressure recovery and pressure reduction are thus repeated while the purging flow rate is increased and decreased between the upper-limit value and lower-limit value of the pressure reduction target value, the purging flow rate adheres to the lower-limit value. Specifically, even if the purging flow rate is reduced, the tank pressure no longer rises to the target upper-limit value. Alternatively, the purging flow rate adheres to the upper-limit value, so that even if the purging flow rate is increased, the tank pressure no longer drops to the target lower-limit value. This indicates that the tank pressure is in a negative pressure state between the upper-limit value and the lower-limit value, and that a stable point which is such that the tank pressure does not vary even if the purging flow rate is varied has been reached; accordingly, when such a state is reached, the feedback pressure reduction is ended.

As a result of this pressure reduction, the differential pressure between the pressure indicated by the internal pressure sensor 11 and the actual tank pressure becomes virtually zero. The time required for this pressure reduction mode is (for example) 30 to 40 seconds.

After the tank system has reached a predetermined negative pressure state, all of the valves 24, 26, and 30 are closed, and the processing shifts to the tank leak checking mode. If there is no leakage in the tank system, the negative pressure is more or less maintained, so that the amount of pressure that is restored (this is due to the effects of vapor) is small. If there is leakage in the tank system, the amount of pressure that is restored is large. Since it is necessary to detect extremely small holes such as holes with a diameter of 0.5 mm, the time required for the tank leak checking mode is (for example) 30 seconds.

Next, the bypass valve 24 and vent shut valve 26 are opened, and the processing shifts to the vapor checking mode (pressure recovery mode), so that the tank system is returned to atmospheric pressure. Here, in cases where the tank pressure fluctuates toward atmospheric pressure from a positive pressure, this indicates that the tank pressure has fluctuated to a positive pressure as a result of vapor generation, etc., during the tank leak check, so that the accurate amount of pressure shift has not been calculated during the tank leak check; accordingly, judgement of the presence or absence of leakage is prohibited. Conversely, in cases where the tank pressure fluctuates to atmospheric pressure from a negative pressure, the presence of absence of leakage in the tank system is judged on the basis of a value obtained by subtracting (i) a value produced by multiplying the amount of pressure shift per unit time during the correction check by a coefficient, from (ii) the amount of pressure shift per unit time during the leak check. The time required for the vapor checking mode is, for example 3 seconds.

Thus, the judgement of the presence or absence of leakage in the tank system is performed on the basis of the amount of pressure recovery from a negative pressure state. However, in cases where a large amount of vapor is generated during the tank leak checking mode, so that the tank pressure varies from a negative pressure to a positive pressure, the amount of pressure shift decreases as the pressure moves to a positive pressure; as a result, the overall amount of shift in the tank pressure is conspicuously reduced, so that (for example) the system may be judged to be normal (free of leakage) even if there is a hole in the fuel tank. Furthermore, a tank leak checking mode that requires a considerable period of time (30 to 60 seconds) is necessary in order to detect leakage caused by extremely small holes such as holes with a diameter of 0.5 mm. Accordingly, in cases where the tank pressure rises to a positive pressure during the tank leak check, judgement of the presence or absence of leakage in the tank system cannot be accurately performed.

In the present invention, the tank pressure at the time of completion of the tank leak check and the tank pressure at the time of initiation of the vapor check are compared, and a judgement is made as to whether or not the tank pressure has dropped to atmospheric pressure from a positive pressure. On the basis of this judgement, a judgement is made as to whether or not a judgement of the presence or absence of leakage in the tank system should be performed.

Calculation of Amounts of Fuel Consumption

Figure 5:
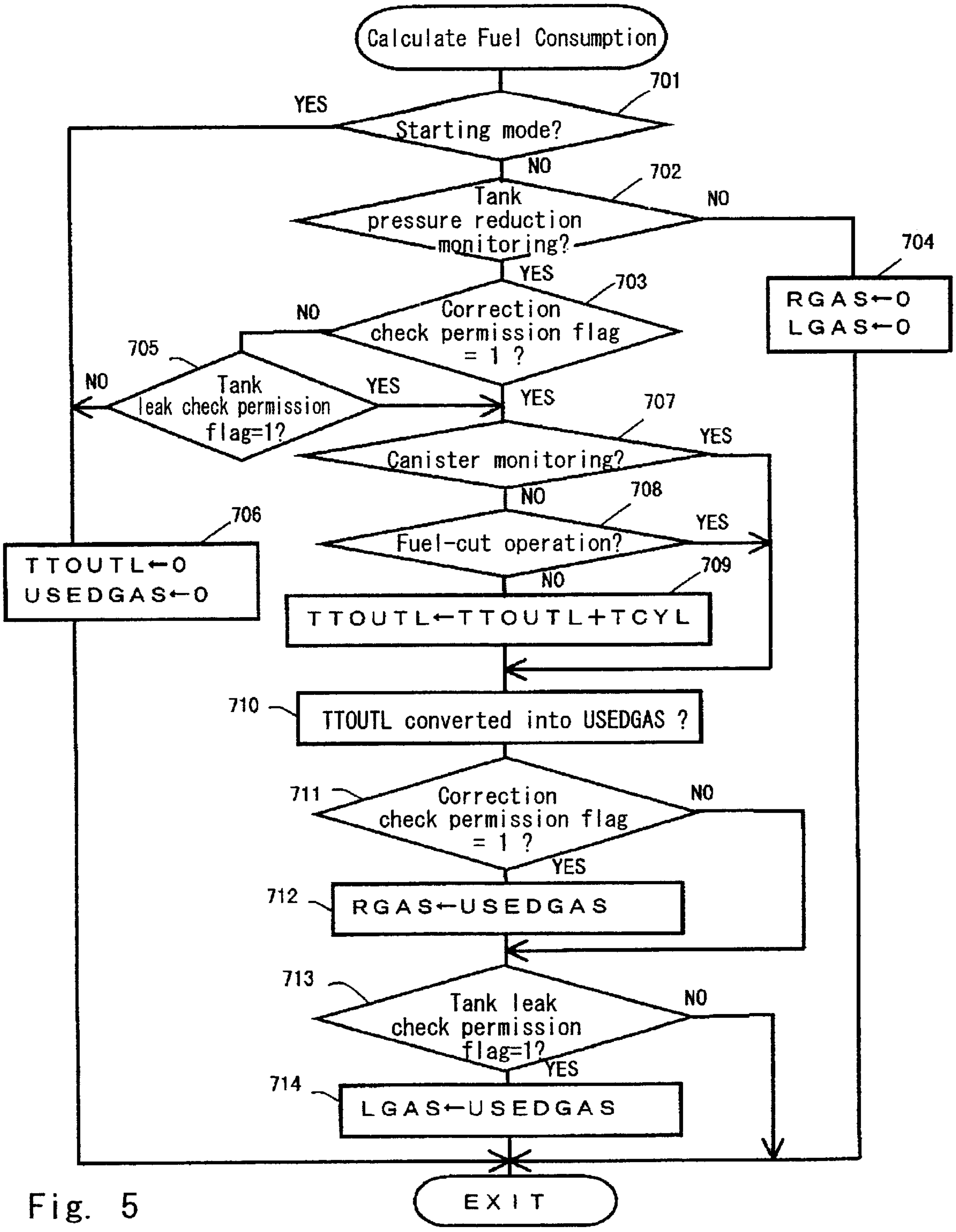
FIG. 5 is a flow chart showing the calculation of the amounts of fuel consumption in the correction checking mode and the tank leak checking mode.

FIG. 5 is a flow chart which shows the processing that calculates the amounts of fuel consumption in the correction checking mode and tank leak checking mode. This processing is performed by the fuel consumption calculating part 8 shown in FIG. 2. This processing can be appropriately performed in the background of the processing performed in tank pressure reduction monitoring.

In step 701, a judgement is made as to whether or not the vehicle is in starting mode. If the vehicle is in starting mode, the processing advances to step 706, and the total fuel injection time TTOUTL and amount of fuel consumption USEDGAS are respectively initialized to zero. If the vehicle is not in starting mode, the fuel consumption amount calculation process is initiated.

In step 702, a judgement is made as to whether or not the system is currently engaged in tank pressure reduction monitoring. If the system is currently engaged in tank pressure reduction monitoring, the processing advances to step 704, and the amount of fuel consumption RGAS during the correction check, and the amount of fuel consumption LGAS during the tank leak check, which are to be calculated, are respectively initialized to zero. If the system is engaged in tank pressure reduction monitoring, a judgement is made in step 703 as to whether or not the system is currently engaged in a correction check, this judgement being made on the basis of a correction check permission flag which is set at 1 if the system is engaged in a correction check. If the system is not currently engaged in a correction check, a judgement is made in step 705 as to whether or not the system is currently engaged in a tank leak check, this judgement being made on the basis of a tank leak check permission flag which is set at 1 if the system is engaged in a tank leak check. If the system is not currently engaged in either a correction check or a tank leak check, the processing advances to step 706, and the total fuel injection time TTOUTL and amount of fuel consumption USEDGAS are respectively initialized to zero.

If the system is currently engaged in a correction check or tank leak check, the processing advances to step 707. If the system is not currently engaged in canister monitoring, the processing advances to step 708; furthermore, if the system is not in fuel cut mode, in which no fuel is supplied to the engine, the processing advances to step 709. If the system is currently engaged in canister monitoring or fuel cut mode, the processing skips to step 710, since the above modes have no relation to the fuel consumption involved here.

In step 709, the fuel injection time TCYL is added to the total fuel injection time TTOUTL. Here, the fuel injection time TCYL is the valve opening time of each fuel injection valve 6 controlled by the fuel injection valve control part 81 shown in FIG. 2. This time is sent from the fuel injection valve control part 81 to the fuel consumption calculating part 80. The processing shown in FIG. 5 is repeatedly performed at predetermined times; accordingly, the fuel injection time during the correction check or tank leak check are totaled as TTOUTL in step 709.

The processing advances to step 710, and the total fuel injection time TTOUTL calculated in step 709 is converted into the amount of fuel consumption USEDGAS. This conversion is performed according to the formula shown below. Here, the injection time per 0.1 cc is a predetermined value.

USEDGAS=TTOUTL/injection time per 0.1 cc of fuel (Formula 1)

The processing advances to step 711, and a judgement is made on the basis of the correction check permission flag as to whether or not the system is still currently engaged in a correction check. If the system is engaged in a correction check, the processing advances to step 712, and the amount of fuel consumption USEDGAS calculated in step 710 is set as the correction check fuel consumption amount RGAS; this RGAS is stored in the RAM 93. The processing then advances to step 713, and a judgement is made on the basis of the tank leak check permission flag as to whether or not the system is still currently engaged in a tank leak check. If the system is engaged in a tank leak check, the processing advances to step 714, and the amount of fuel consumption USEDGAS calculated in step 710 is set as the tank leak check fuel consumption amount LGAS; this LGAS is stored in the RAM 93. The stored RGAS and LGAS are used in the vapor checking mode.

The programs used to perform the processing shown in the flow charts for the correction check, tank leak check and vapor check described below are part of the programs that perform the tank pressure reduction monitoring process that is invoked (for example) every 80 milliseconds.

Correction Checking Mode

Figure 6:
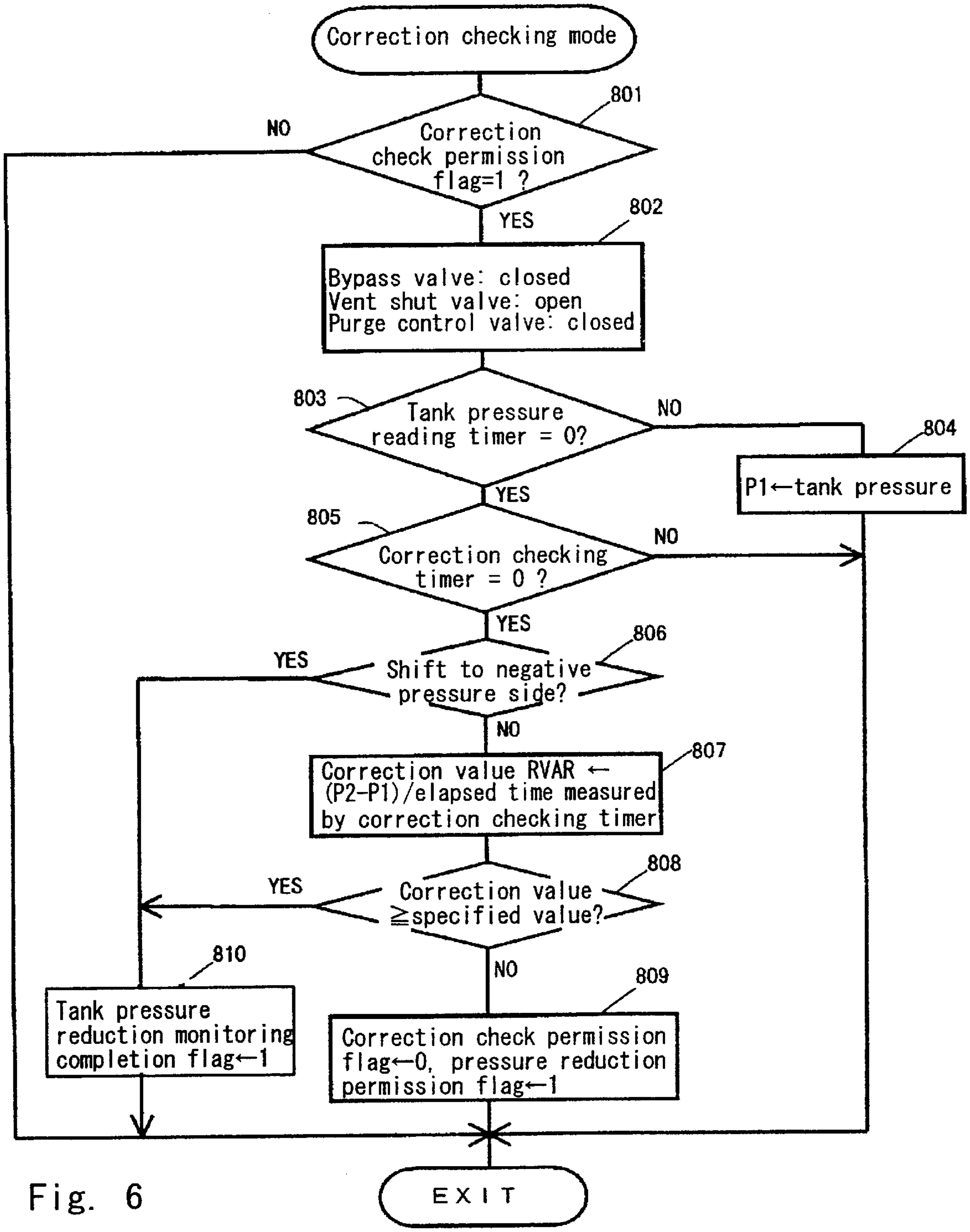
FIG. 6 is a flow chart showing the calculation of the amount of pressure shift per unit time in the correction checking mode.

FIG. 6 is a flow chart showing the calculation of the correction value in the correction checking mode. This processing is performed by the correction checking part 62 and associated pressure shift calculating part 71 shown in FIG. 2. If the correction check permission flag that is set by the opening-to-atmosphere part 61 (FIG. 2) upon the completion of the processing of the opening-to-atmosphere mode is 1 in step 801, the processing advances to step 802, and the correction checking process is initiated. In step 802, the bypass valve 24 and purge control valve 30 are closed, and the vent shut valve 26 is opened.

The processing advances to step 803, and if the tank pressure reading timer is not at zero, the processing advances to step 804. Here, the output of the internal pressure sensor 11 is detected, and is stored in the RAM 93 as the initial value P1 of the tank pressure. The reason for the installation of a tank pressure reading timer is to read the tank pressure when the pressure has become settled to some extent following the passage of a predetermined amount of time, since the tank pressure fluctuates when the bypass valve 24 is closed from an open state.

If the tank pressure reading time is at zero in step 803, i.e., if a predetermined amount of time has elapsed, the processing proceeds to step 805, and a judgement is made as to whether or not the correction checking mode timer is at zero. The correction checking mode timer is used in order to ascertain whether or not the time required for the calculation of the correction value has elapsed; this timer is set at a larger value than the above-mentioned tank pressure reading time. If the correction checking mode timer is at zero, the processing proceeds to step 806.

In step 806, the current tank pressure P2 and the initial value P1 of the tank pressure stored in step 804 are compared, and a judgement is made as to whether or not the tank pressure has fluctuated toward the negative pressure side by a predetermined value or greater. If this pressure fluctuates toward the negative pressure side, this indicates that the evaporated fuel is in a liquefied state as a result of a drop in the temperature inside the fuel tank, so that an appropriate correction value cannot be obtained. Accordingly, the processing proceeds to step 810, the tank pressure reduction monitoring completion flag is set at 1, and tank pressure reduction monitoring in this operating cycle is prohibited.

If there is no shift to the negative pressure side in step 806, the processing proceeds to step 807, and a correction value RVAR indicating the amount of shift in the tank pressure per unit time is calculated according to the formula shown below.

Correction value RVAR=(P2−P1 )/elapsed time measured by correction checking timer (Formula 2)

The processing proceeds to step 808; here, if the calculated correction value RVAR is equal to or greater than a predetermined value, there is a possibility that the tank pressure will adhere to the positive pressure side control pressure of the two-way valve 23 as a result of the generation of large amounts of vapor. The value calculated in such a state is not an appropriate correction value; accordingly, the processing proceeds to step 810, the tank pressure reduction monitoring completion flag is set at 1, and tank pressure reduction monitoring is prohibited. If the correction value RVAR is smaller than the predetermined value, the processing proceeds to step 809, the correction check permission flag is set at zero, and the pressure reduction permission flag is set at 1 in order to perform the next pressure reduction mode processing. The correction value RVAR thus obtained is stored in the RAM 93, and is used in the vapor checking mode.

Tank Leak Checking Mode

Figure 7:
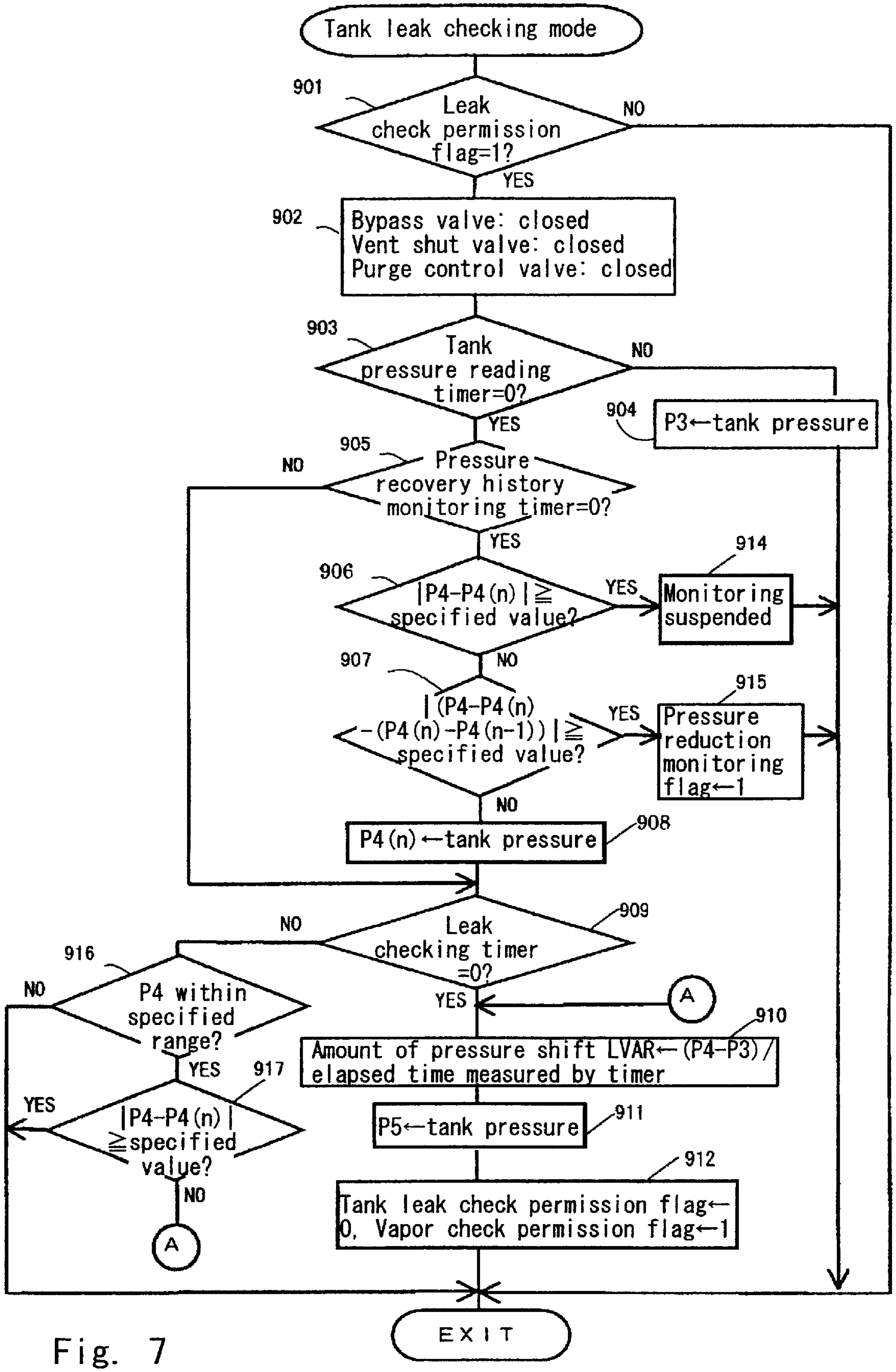
FIG. 7 is a flow chart showing the calculation of the amount of pressure shift per unit time in the tank leak checking mode.

FIG. 7 is a flow chart showing the calculation of the amount of pressure shift per unit time when the interior of the fuel tank is placed under a negative pressure in the tank leak checking mode. This calculation is performed by the tank leak checking part 65 and associated pressure shift calculating part 72 shown in FIG. 2. If the tank leak check permission flag which is set at 1 by the pressure reduction mode part 63 (FIG. 2) upon the completion of the pressure reduction mode processing is 1 in step 901, the processing proceeds to step 902, and the tank leak checking process is initiated.

In step 902, the bypass valve 24, vent shut valve 26 and purge control valve 30 are all closed. The processing proceeds to step 903, and a judgement is made as to whether or not the tank pressure reading timer is at zero. If the tank pressure reading timer is not at zero, the processing proceeds to step 904, and the value detected by the internal pressure sensor 11 is stored in the RAM 93 as the initial value P3 of the tank pressure. As in the case of the correction checking mode, the reason for the installation of the tank pressure reading timer is to read the tank pressure after the pressure has become settled to some extent following the passage of a predetermined amount of time.

If the tank pressure reading timer is at zero in step 903, the processing proceeds to step 905, and a judgement is made as to whether or not the pressure recovery history monitoring timer is at zero. If this timer is at zero, pressure recovery history monitoring (steps 906 to 908) is performed. This pressure recovery history monitoring is performed at predetermined time intervals during the processing of the tank leak checking mode. Each time, the tank pressure is read in step 908 and stored in the RAM 93 in a time series (i.e., this is stored with the previous tank pressure as P4(n) and the tank pressure before that as P4(n−1), etc.), so that the amount of pressure shift is monitored.

In step 906, if the absolute value of the difference between the current tank pressure P4 and the previous tank pressure P4(n) is equal to or greater than a predetermined value, this is judged to be an abrupt change in pressure caused by oscillation of the liquid level, etc., so that an appropriate amount of pressure shift cannot be calculated. Accordingly, tank pressure reduction monitoring is suspended, and the pressure is restored so that the processing returns to the ordinary mode. Here, the reason that the monitoring is suspended rather than being prohibited is that although there was an abrupt pressure shift in the current tank leak check, such a pressure variation may not occur in the next tank leak check.

The processing proceeds to step 907, and the difference P4–P4(n) between the current tank pressure P4 and the previous tank pressure P4(n) (this is designated as ΔPx), and the difference P4(n)–P4(n–1) between the previous tank pressure P4(n) and the tank pressure P4(n–1) preceding said previous tank pressure P4(n) (this is designated as ΔPy), are calculated. If the absolute value |ΔPx–ΔPy| of the difference between ΔPx and ΔPy is equal to or greater than a predetermined value, it is judged that the fuel tank is in full-tank cut-off valve operation. Since an appropriate amount of pressure shift cannot be calculated in such a state, the processing proceeds to step 915, the tank pressure reduction monitoring completion flag is set at 1, and tank pressure reduction monitoring for this operating cycle is prohibited.

After the pressure recovery history monitoring has been completed, the processing proceeds to step 909, and a judgement is made as to whether or not the tank leak checking timer is at zero. If this timer is at zero, the processing proceeds to step 910, and the amount of pressure shift per unit time (LVAR) in the tank leak checking mode is calculated according to the formula shown below on the basis of the current tank pressure P4 and the initial value P3 of the tank pressure stored in step 904. This calculated LVAR is stored in the RAM 93, and is used in the vapor checking mode.

Amount of pressure shift per unit time LVAR=(P4–P3)/elapsed time measured by tank leak checking timer. (Formula 3)

The processing proceeds to step 911, and the pressure value detected by the internal pressure sensor 11 is stored in the RAM 93 as the tank pressure P5 at the time of completion of the tank leak check. This value is used in the subsequent vapor checking mode. The processing proceeds to step 912, the tank leak check permission flag is set at zero, and the vapor check permission flag is set at 1 in order to perform the subsequent processing in the vapor checking mode.

If the tank leak checking timer is not at zero in step 909, the processing proceeds to step 916, and a judgement is made as to whether or not the current tank pressure P4 is within a predetermined range in the vicinity of atmospheric pressure. If the current tank pressure P4 is within this predetermined range, the processing proceeds to step 917, and a judgement is made as to whether or not the absolute value |P4–P4(n)| of the difference between the current tank pressure P4 and the previous tank pressure P4(n) is equal to or greater than a predetermined value. If the absolute value of said difference is smaller than this predetermined value, this indicates that the pressure has become more or less settled, so that there is no need to wait for the passage of time as measured by the tank leak checking timer. Accordingly, the processing proceeds to step 910, and the amount of pressure shift per unit time is calculated. The calculation in this case is performed using the following formula:

Amount of pressure shift per unit time LVAR=(P4–P4(n)/time from the starting of the tank leak checking timer to the judgement made in step 917. (Formula 4)

Vapor Checking Mode

Figure 8:
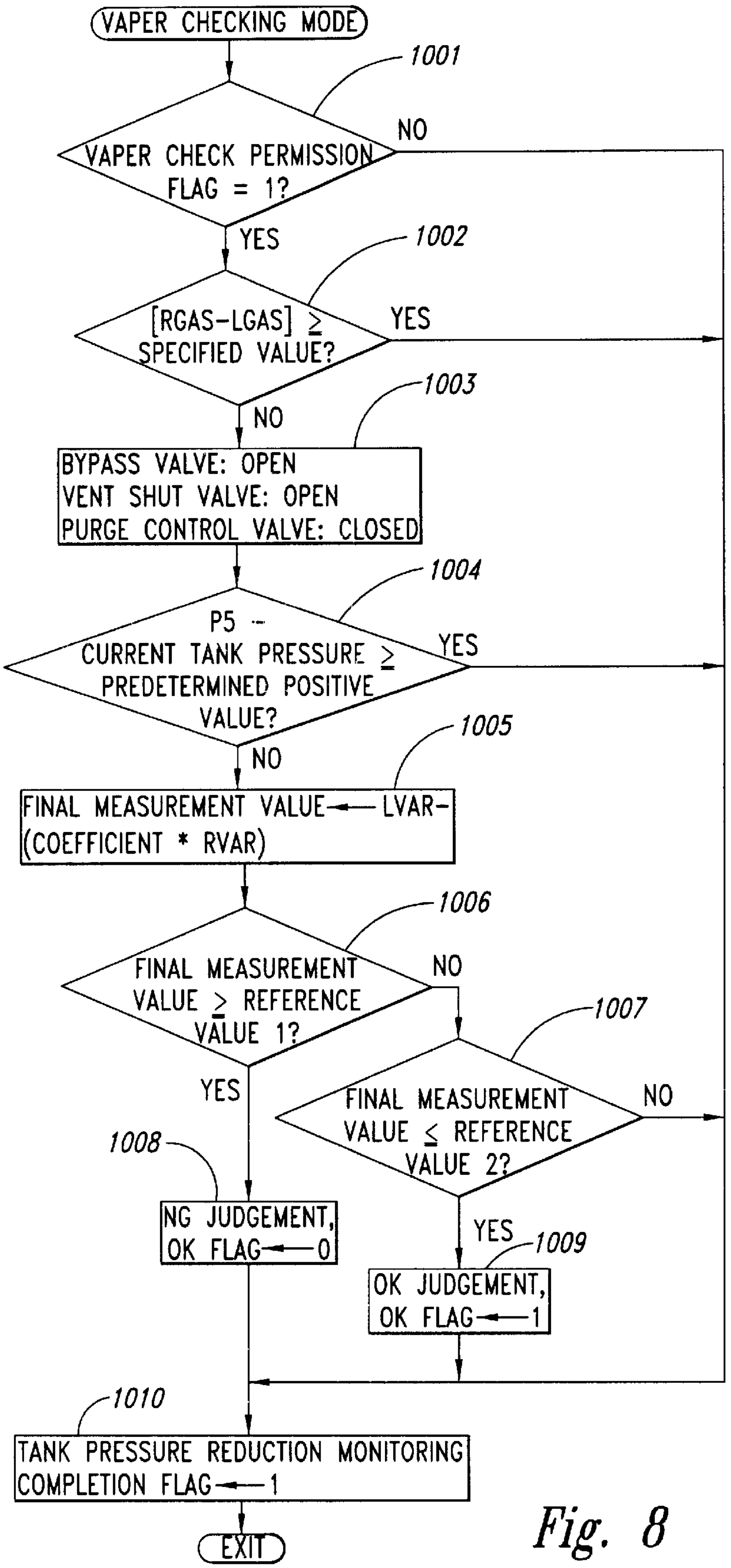
FIG. 8 is a flow chart showing the judgement of the presence or absence of leakage in the tank system in the vapor checking mode.

FIG. 8 is a flow chart which shows the judgement of the status of the tank pressure upon the completion of the tank leak checking mode, and the judgement of the presence or absence of leakage in the tank system, in the vapor checking mode. This processing is performed by the vapor checking part 66 shown in FIG. 2, the judgement execution checking part 73 contained in said vapor checking part 66, the pressure variation checking part 74, the judgement prohibition part 75 and the judgement part 76. If the vapor check permission flag which is set upon the completion of the tank leak check processing is 1 in step 1001, the processing proceeds to step 1002, and the vapor checking process is initiated.

In step 1002, a judgement is made as to whether or not the absolute value of the difference between the correction check fuel consumption amount RGAS obtained in step 712 (FIG. 5) and the tank leak check fuel consumption amount LGAS obtained in step 714 is equal to or greater than a predetermined value (e.g., 10 cc). If the absolute value of this difference is equal to or greater than this predetermined value, then it is judged that an accurate judgement cannot be made, since the operating states for the two modes differ greatly. Accordingly, the processing proceeds to step 1010, the tank pressure reduction monitoring completion flag is set at 1, and tank pressure reduction monitoring for this operating cycle is prohibited. As a result, no judgement of the presence or absence of leakage in the tank system is performed. In regard to the predetermined value, data indicating the effects of different operating states in the correction checking mode and leak checking mode on the detection of leakage caused by very small holes is accumulated by experiment and simulation, and the predetermined value is determined on the basis of the results obtained.

In the present working configuration, the amount of fuel consumption RGAS is the total amount of fuel consumption throughout the entire period of processing in the correction checking mode, and the amount of fuel consumption LGAS is the total amount of fuel consumption throughout the entire period of processing in the tank leak checking mode. These respective total amounts of fuel consumption are compared (step 1002); accordingly, predetermined values corresponding to the Measurement time of the respective amounts of fuel consumption is used. Alternatively, the respective amounts of fuel consumption per unit time for the correction checking mode and tank leak checking mode may be calculated, and a comparison may be performed using predetermined values corresponding to these respective amounts of fuel consumption.

In step 1002, if the absolute value of the difference between RGAS and LGAS is smaller than the value determined as described above, the processing proceeds to step 1003; here, the bypass valve 24 and vent shut valve 26 are opened, and the purge control valve is closed, so that the tank system is opened to atmospheric pressure. The processing then proceeds to step 1004; here, the current tank pressure and the tank pressure P5 measured upon the completion of the tank leak check, which was stored in step 911 of the tank leak check (FIG. 7), are compared, and a judgement is made as to whether or not the tank pressure has dropped toward atmospheric pressure from a positive pressure. In other words, a judgement is made as to whether or not the tank pressure was a positive pressure.

If the tank pressure has dropped from a positive pressure toward atmospheric pressure by an amount that is equal to or greater than a predetermined value (e.g., 1.0 mmHg), this indicates that large amounts of vapor were generated so that the tank pressure fluctuated to a positive pressure at the time of completion of the tank leak checking mode, thus making it impossible to make an accurate judgement. Accordingly, the processing proceeds to step 1010, the tank pressure reduction monitoring completion flag is set at 1, and monitoring is thus prohibited so that no judgement of the projection optical system of leakage in the tank system is made. If the tank pressure has not dropped from a positive pressure to atmospheric pressure by an amount equal to or greater than the predetermined value, the processing proceeds to step 1005, and the final measurement value used to make a judgement is calculated using the following formula:

Final measurement value=LVAR−(correction coefficient *RVAR) (Formula 5)

Here, LVAR is the amount of pressure shift per unit time during the tank leak check obtained in step 910 (FIG. 7), and RVAR is the amount of pressure shift per unit time during the correction check obtained in step 807 (FIG. 6). The correction coefficient is a coefficient used to correct for the respective pressure rises, since the conditions are different for the pressure rise from atmospheric pressure in the correction checking mode and the pressure rise from a negative pressure in the tank leak checking mode. For example, this coefficient is 1.5 to 2.0.

The processing proceeds to step 1006; here, if the calculated final measurement value is equal to or greater than judgement value 1 (e.g., 8 mmHg), it would appear that the pressure rise in the tank leak checking mode is caused by leakage in the tank system. Accordingly, the processing proceeds to step 1008, and a judgement of "abnormal" with leakage in the tank system is made judgment of NG); consequently, the OK flag is set at "0". If the calculated final measurement value is smaller than judgment value 1, the processing proceeds to step 1007. In step 1007, if the calculated final measurement value is equal to or less than judgement value 2 (e.g., 3 mmHg), it would appear that the pressure rise in the tank leak checking mode is caused by the generation of vapor. Accordingly, the processing proceeds to step 1009, and a judgement of "normal" with no tank leakage (judgement of OK) is made; consequently, the OK flag is set at "1".

In step 1007, if the final measurement value is larger than judgement value 2, i.e., if the final measurement value is larger than judgement value 2 but smaller than judgement value 1, this means that the presence or absence of leakage cannot be accurately judged. Accordingly, the processing proceeds to step 1010, the tank pressure reduction monitoring completion flag is set at 1, and tank pressure reduction monitoring is prohibited. These relationships are shown in the table below.

TABLE 1

| | |
|---|---|
| Final measurement value ≧ judgement value 1 | NG |
| Final measurement value ≦ judgement value 2 | OK |
| Judgement value 2 < final measurement value < judgement value 1 | No judgement made |

Thus it has been shown that the present invention makes it possible to improve the reliability of judgments of the presence or absence of leakage in the tank system.

What we claim is:

1. An evaporated fuel treatment apparatus for an internal combustion engine having a fuel tank, a canister having an opening to the atmosphere, the opening being opened or closed by a vent shut valve, a passage allowing the fuel tank to communicate with the canister, a purging passage allowing the canister to communicate with the intake manifold of the engine, the intake manifold having a reduced pressure as the engine intakes air, and a pressure sensor for detecting the internal pressure of the fuel tank, said apparatus comprising:

tank leak checking means that closes the tank after placing the tank under a negative pressure and detects the conditions of change in the internal pressure of the fuel tank for a predetermined period, pressure variation checking means that opens the fuel tank to the atmosphere after the predetermined period and judges whether or not the pressure inside the fuel tank has dropped, and judgment prohibition means that prohibits a judgment of the presence or absence of leakage based on the detection results obtained by the tank leak checking means if the pressure variation checking means judges that the pressure of the fuel tank has dropped.

2. A method for judging whether detection of vapor leaks in a fuel tank system having a fuel tank is allowable, the method comprising:

placing the fuel tank under a negative pressure;

closing the fuel tank to the atmosphere and monitoring the change in vapor pressure in the tank for a predetermined period of time;

opening the tank to the atmosphere after the predetermined period of time and determining whether or not vapor pressure in the fuel tank has dropped from a positive pressure toward the atmospheric pressure; and prohibiting a determination of the presence or absence of vapor leaks in the fuel tank system based on the change in vapor pressure monitored for the predetermined period of time if the vapor pressure has dropped from a positive pressure toward the atmospheric pressure.

3. The method of claim 1 wherein determining if the vapor pressure in the fuel tank has dropped comprises comparing the vapor pressure in the fuel tank after the predetermined period of time to the vapor pressure in the fuel tank when the fuel tank was opened to the atmosphere.

4. The method of claim 1 wherein determining if the vapor pressure has dropped from a positive pressure toward the atmospheric pressure comprises determining if the vapor pressure in the fuel tank has dropped from a positive pressure toward atmospheric pressure by an amount that is equal to or greater than a predetermined value.

5. The method of claim 1 wherein the predetermined value is in the range of 0.8 mmHg to 1.2 mmHg.

6. The method of claim 1, further comprising determining the rate of fuel consumption when the fuel tank is closed to the atmosphere and determining the rate of fuel consumption when the fuel tank is open to the atmosphere and prohibiting the determination of the presence or absence of vapor leaks in the fuel tank if the difference between the first rate and the second rate is greater than a predetermined value.

7. The method of claim 1 wherein the determination of the presence or absence of vapor leaks in the fuel tank system based on the change in vapor pressure monitored for the predetermined period of time comprises determining the presence of vapor leaks in the fuel tank system if the change in vapor pressure monitored for the predetermined period of time meets a predetermined leak detection threshold value.

8. The method of claim 1 wherein the determination of the presence or absence of vapor leaks in the fuel tank system based on the change in vapor pressure monitored for the predetermined period of time comprises determining the presence of vapor leaks in the fuel tank system if a rate of the change in vapor pressure monitored for the predetermined period of time meets a predetermined leak detection threshold rate.

9. The method of claim 1 wherein the change in vapor pressure monitored for the predetermined period of time is corrected with a pressure shift measured with the fuel tank being open to the atmosphere.

* * * * *

UNITED STATES PATENT AND TRADEMARK OFFICE
CERTIFICATE OF CORRECTION

PATENT NO. : 6,354,143 B1
DATED : March 12, 2002
INVENTOR(S) : Takashi Isobe et al.

It is certified that error appears in the above-identified patent and that said Letters Patent is hereby corrected as shown below:

Column 16,
Line 26, "The method of claim 1" should be corrected to read -- The method of claim 2 --.
Line 31, "The method of claim 1" should be corrected to read -- The method of claim 2 --.
Line 37, "The method of claim 1" should be corrected to read -- The method of claim 4 --.
Line 39, "The method of claim 1" should be corrected to read -- The method of claim 2 --.
Line 46, "The method of claim 1" should be corrected to read -- The method of claim 2 --.
Line 53, "The method of claim 1" should be corrected to read -- The method of claim 2 --.
Line 61, "The method of claim 1" should be corrected to read -- The method of claim 2 --.

Signed and Sealed this

Twenty-second Day of October, 2002

*Attest:*

JAMES E. ROGAN
*Attesting Officer* *Director of the United States Patent and Trademark Office*